United States Patent
Marsala et al.

(10) Patent No.: US 10,145,975 B2
(45) Date of Patent: Dec. 4, 2018

(54) COMPUTER PROCESSING OF BOREHOLE TO SURFACE ELECTROMAGNETIC TRANSMITTER SURVEY DATA

(71) Applicants: Saudi Arabian Oil Company, Dhahran (SA); BGP Arabia Co., Ltd., Al-Khobar (SA)

(72) Inventors: Alberto Marsala, Bergamo (IT); Muhammad H. Al-Buali, Al-Hassa (SA); Tang Biyan, Zhuozhou (CN); Zhanxiang He, Zhuozhou (CN)

(73) Assignees: Saudi Arabian Oil Company, Dhahran (SA); BGP Arabia Co. Ltd., Zhuozhou, Hebel Province (CN)

( * ) Notice: Subject to any disclaimer, the term of this patent is extended or adjusted under 35 U.S.C. 154(b) by 0 days.

(21) Appl. No.: 15/450,998

(22) Filed: Mar. 6, 2017

(65) Prior Publication Data
US 2017/0351000 A1  Dec. 7, 2017

Related U.S. Application Data

(63) Continuation-in-part of application No. 14/221,950, filed on Mar. 21, 2014, now Pat. No. 9,405,033, and a continuation-in-part of application No. 14/221,854, filed on Mar. 21, 2014, now Pat. No. 9,696,450, which is a continuation of application No. 13/090,691, filed on Apr. 20, 2011, now Pat. No.
(Continued)

(51) Int. Cl.
G01V 3/20 (2006.01)
G01V 3/38 (2006.01)

(52) U.S. Cl.
CPC . *G01V 3/20* (2013.01); *G01V 3/38* (2013.01)

(58) Field of Classification Search
CPC ... G01V 3/20; G01V 3/30; G01V 3/38; G01V 3/26; G01V 3/28
USPC .......................................................... 324/370
See application file for complete search history.

(56) References Cited

U.S. PATENT DOCUMENTS 4,422,043 A  * 12/1983  Meador .................... G01V 3/30
                                                                        324/338
4,431,963 A     2/1984  Walkow
(Continued)

FOREIGN PATENT DOCUMENTS

JP    59501962 A    11/1984
JP     8101168 A     4/1996
(Continued)

OTHER PUBLICATIONS

Alabi et al., "Induced polarization interpretation for subsurface characterization: A Case study of Obadore, Lagos State", Archives of Physics Research, 2010, pp. 34-43, Scholars Research Library.
(Continued)

*Primary Examiner* — Christopher P McAndrew
(74) *Attorney, Agent, or Firm* — Bracewell LLP; Constance G. Rhebergen; Alan B. Kimball, Jr.

(57) ABSTRACT

Data obtained with an electromagnetic energy transmitter in borehole to surface electromagnetic (BSEM) transmitter is processed. The processed data provides measures of detected electromagnetic fields, induced polarization and electromagnetic well logging information of interest for surveying and mapping of subsurface formations.

7 Claims, 7 Drawing Sheets

Related U.S. Application Data 8,680,866, said application No. 14/221,950 is a continuation of application No. 13/090,691, filed on Apr. 20, 2011, now Pat. No. 8,680,866.

(56) References Cited

U.S. PATENT DOCUMENTS

| | | | |
|---|---|---|---|
| 4,662,209 A * | 5/1987 | Brown | E21B 45/00 181/103 |
| 4,739,325 A | 4/1988 | Macleod | |
| 4,785,247 A | 11/1988 | Meador et al. | |
| 4,875,015 A * | 10/1989 | Ward | G01V 3/20 324/323 |
| 5,869,968 A | 2/1999 | Brooks et al. | |
| 7,077,200 B1 | 7/2006 | Adnan et al. | |
| 7,482,578 B2 * | 1/2009 | Randall | G01T 7/005 250/261 |
| 7,622,916 B2 * | 11/2009 | Meeten | G01N 27/72 324/220 |
| 7,665,544 B2 * | 2/2010 | Forgang | G01V 3/20 175/50 |
| 2002/0032529 A1 | 3/2002 | Duhon | |
| 2005/0139759 A1 * | 6/2005 | Pitts | G01V 5/10 250/269.6 |
| 2005/0263281 A1 * | 12/2005 | Lovell | E21B 47/123 166/255.1 |
| 2008/0128166 A1 * | 6/2008 | Forgang | G01V 3/20 175/50 |
| 2008/0221800 A1 * | 9/2008 | Gladkikh | G01V 3/32 702/11 |
| 2009/0037111 A1 * | 2/2009 | Radtke | G01V 11/00 702/11 |
| 2014/0132272 A1 | 5/2014 | Cuevas et al. | |
| 2014/0203811 A1 | 7/2014 | Marsala et al. | |

FOREIGN PATENT DOCUMENTS

| | | |
|---|---|---|
| WO | 2009158189 A2 | 12/2009 |
| WO | 2011041248 A2 | 4/2011 |

OTHER PUBLICATIONS

Constable et al., "Occam's inversion: A practical algorithm for generating smooth models from electromagnetic sounding data", Geophysics, 1987, pp. 289-300, vol. 52, No. 3, Society of Exploration Geophysicists.

International Search Report and Written Opinion for Related PCT Application PCT/US2012/034378, dated Mar. 14, 2013.

Fitzpatrick, "Electric Potential and Electric Field", http://farside.ph.utexas.edu/teaching/3021/lectures/node34.html.

He, Z. et al., "Geo-Electrical Anomaly Pattern of Reservoir and Geo-Electrical Methods for Direct Reservoir Detection", SEG 2007 Annual Meeting.

He, Z. et al., "Petroleum Electromagnetic Prospecting Advances and Case Studies in China", Surv Geophys, Jan. 15, 2010, DOI 10, 1007/s10712-00909093-z, Springer.

Wang, C. et al., "Lithology Study Using TFEM Technique in Western Qaidam Basin", SEG/New Orleans 2006 Annual Meeting.

Zhdanov et al., "Carbonate Reservoir Rocks Show Induced Polarization Effects, Based on Generalized Effective Medium Theory", 75th EAGE Conference & Exhibition incorporating SPE EUROPEC London UK, 2013, pp. 1-5, EAGE.

International Search Report and Written Opinion dated Jun. 6, 2018 for corresponding PCT/US2018/019997.

Zhanxiang, He, et al: "Petroleum Electromagnetic Prospecting Advances and Case Studies in China," Surveys in Geophysics, Kluwer Academic Pub Li Shers, DO, vol. 31, No. 2, Jan. 15, 2010, pp. 207-224.

* cited by examiner

COMPUTER PROCESSING OF BOREHOLE TO SURFACE ELECTROMAGNETIC TRANSMITTER SURVEY DATA

CROSS REFERENCE TO RELATED APPLICATIONS

The present application is a continuation-in-part, and claims priority under 35 U.S.C. § 120 to each of: commonly owned U.S. patent application Ser. No. 14/221,854, filed Mar. 21, 2014, (now U.S. Pat. No. 9,696,450 dated Jul. 4, 2017); commonly owned U.S. patent application Ser. No. 14/221,950, filed Mar. 21, 2014, (now U.S. Pat. No. 9,405,033 dated Aug. 2, 2016); and commonly owned U.S. patent application Ser. No. 13/090,691, filed Apr. 20, 2011, (now U.S. Pat. No. 8,680,866 dated Mar. 25, 2014), of which U.S. patent application Ser. No. 14/221,854 and U.S. patent application Ser. No. 14/221,950 are continuations claiming priority under 35 U.S.C. § 120.

BACKGROUND OF T INVENTION

1. Field of the Invention

The present invention relates to an electromagnetic energy source or transmitter for borehole to surface electromagnetic surveying and mapping of subsurface formations.

2. Description of the Related Art

Electromagnetic methods to obtain data regarding subsurface earth formations and their constituent fluid contents have been used for several purposes. Among these have been petroleum reservoir characterization and front-tracking in enhanced oil recovery operations.

One of these electromagnetic methods has been what is known as the borehole-surface or borehole to surface electromagnetic method (BSEM). Two electrodes have been used in the borehole-surface electromagnetic energy method. The first electrode has been in a well borehole of what is known as the transmitter well, transmitting electromagnetic energy, and the other, which may be a ground electrode, has been at the earth's surface along with a receiver array. The receiver array has been located at spaced positions on the surface conforming to the reservoir of interest to detect the energy field after passage through the earth from the first or transmitter electrode.

In a typical operation, Borehole to Surface Electromagnetic (BSEM) utilized an electromagnetic source in the borehole and an array (typically 600-2000 or more) of receivers on the surface, thus allowing the mapping of the fluid (typically oil and water) distribution in large areas of the reservoir a few (2-4) kilometers away from the well in which the transmitter electrode had been positioned.

The transmitter electrode located in the well was activated at depths of interest. The signal emitted on activation could be a single frequency or multiple frequencies. The resultant electromagnetic field which then occurred was sensed in the time and frequency domains by the receiver array. Surveys of this type could then be repeated after passage of a period of time from the transmitter well to track the subsurface fluid migration.

An interface in a subsurface formation between solids and liquids produces induced polarization and frequency scattering responses to the emitted signals and the responses were received and recorded. The recorded data was processed and analyzed to map boundaries of subsurface reservoirs of interest and evaluate other nearby formations. The information obtained was important in assessing the sweep efficiency, or the percentage of original oil displaced from a formation by a flooding fluid, and in locating potential bypassed oil zones, thus ultimately increasing oil recovery.

So far as is known, no provision has been made to obtain a precisely accurate measurement of the depth position of the transmitter downhole. An indirect measurement was possible only from measurements of the length of cable passing from the cable reel or drum in the wireline truck into the well. However, this length measurement did not take into account elongation of the cable at increasing depths in the well. This gave rise to an inability to accurately determine well depth measurements of formations and correlate actual depth of the transmitter emissions of energy with data representative of subsurface conditions.

During BSEM surveying, other well logging operations with other well logging tools present in the well borehole were not, so far as is known, conducted. The purpose of this was so that the transmitter electrode could be easily moved to desired depths in the well. Thus, there was no capability to monitor downhole well conditions during the BSEM survey. Thus, so far as is known, no provision was made to detect incipient abnormal conditions which might provide advance notice of one or more of possible problems, such as overheating of the transmitter electrode, starting of an ignition in the well, a gas kick, overpressure, or the like.

SUMMARY OF THE INVENTION

Briefly, the present invention provides a new and improved electromagnetic energy transmitter mounted with a wireline for electromagnetic surveys of subsurface earth formations from a well borehole which has a casing installed along its extent into the earth to a location near a formation of interest, the casing being formed of lengths of tubular members connected at end portions to adjacent tubular members by casing collars. The electromagnetic energy transmitter includes an electromagnetic energy source emitting electromagnetic energy in the form of electric current when activated, and a control circuit activating the conductive bar to emit electromagnetic energy for a selected time and duration. The electromagnetic energy transmitter also includes a sonde body housing the control circuit. The sonde body is adapted to be lowered by the wireline in the well borehole to the location near the formation of interest. An upper connector subassembly is mounted above the sonde body connecting the control circuit to the wireline and permits the flow of electrical current to the electromagnetic energy source. A lower connector subassembly is mounted below the sonde body and connects the electromagnetic energy source to the control circuit. The electromagnetic energy transmitter also includes a casing collar locator mounted in the sonde body to provide indications of movement of the sonde body past casing collar in the casing during movement of the transmitter through the well borehole. The electromagnetic energy transmitter further includes a fluid pressure sensor mounted in the sonde body for measuring fluid pressure in the well borehole at the location of the sonde body; and a temperature sensor mounted in the sonde body for measuring temperature in the well borehole at the location of the sonde body.

The present invention also provides a new and improved method of electromagnetic surveying subsurface earth formations from a well borehole which has a casing installed along its extent into the earth to a location of interest near a formation of interest, the casing being formed of lengths of tubular members connected at end portions to adjacent tubular members by casing collars. According to the present invention electromagnetic energy source with a sonde body connected therewith is lowered to the location of interest in the borehole. A measure is formed with the casing collar locator of the number of casing collars past which the source and sonde body travel during the step of lowering to determine the depth of the source and sonde body in the borehole based on the measured number of casing collars. The casing collar locator is then deactivated when the source and the sonde body are at the location of interest. Electromagnetic energy is then emitted from the source at the location of interest to travel through the subsurface formations for electromagnetic energy surveying of the subsurface earth formations.

DETAILED DESCRIPTION OF THE PREFERRED EMBODIMENTS

Figure 1:
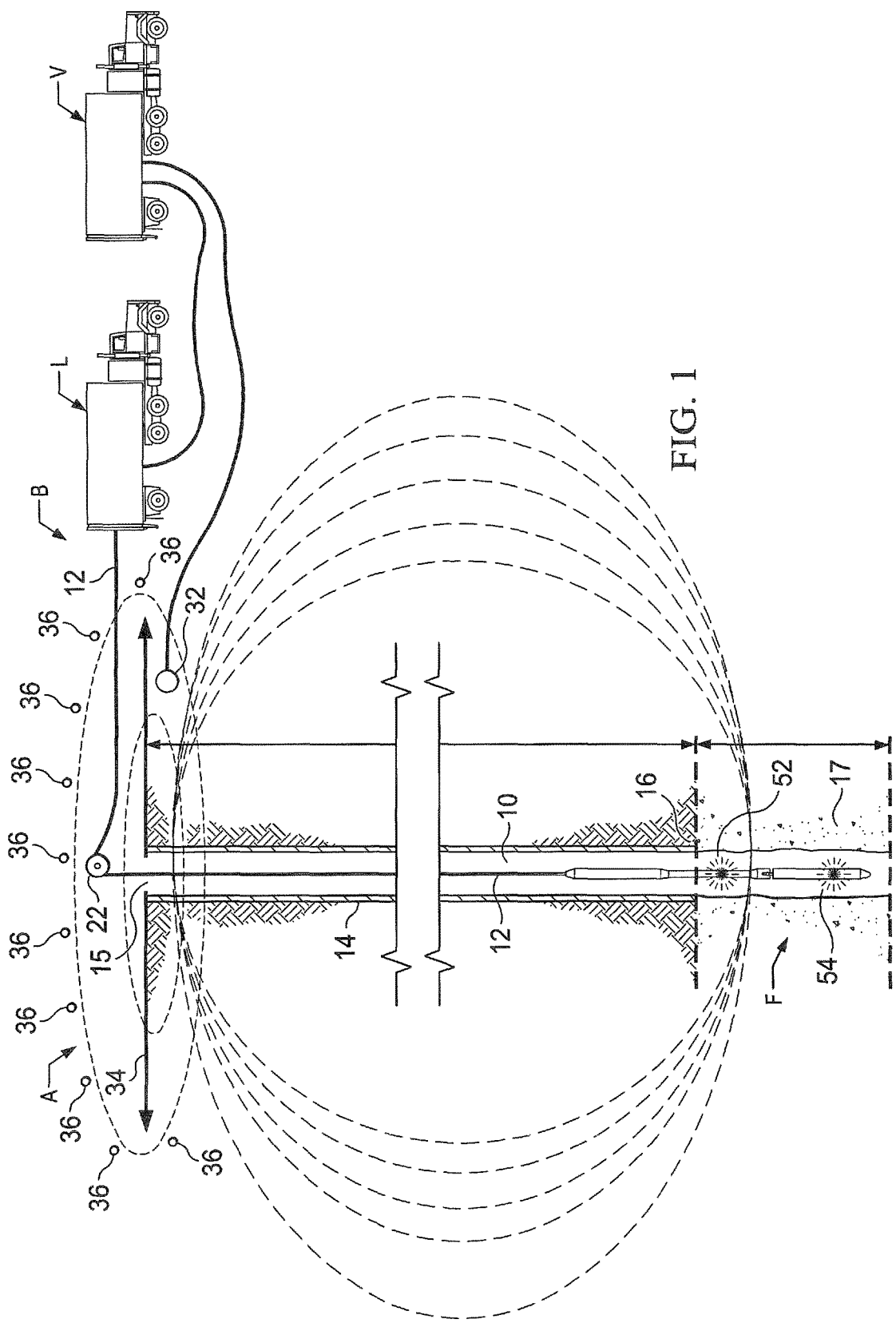
FIG. 1 is a schematic diagram, taken partly in cross-section, of a borehole to surface electromagnetic survey system disposed in a well borehole to obtain borehole to surface electromagnetic survey data according to the present invention.
Figure 2:
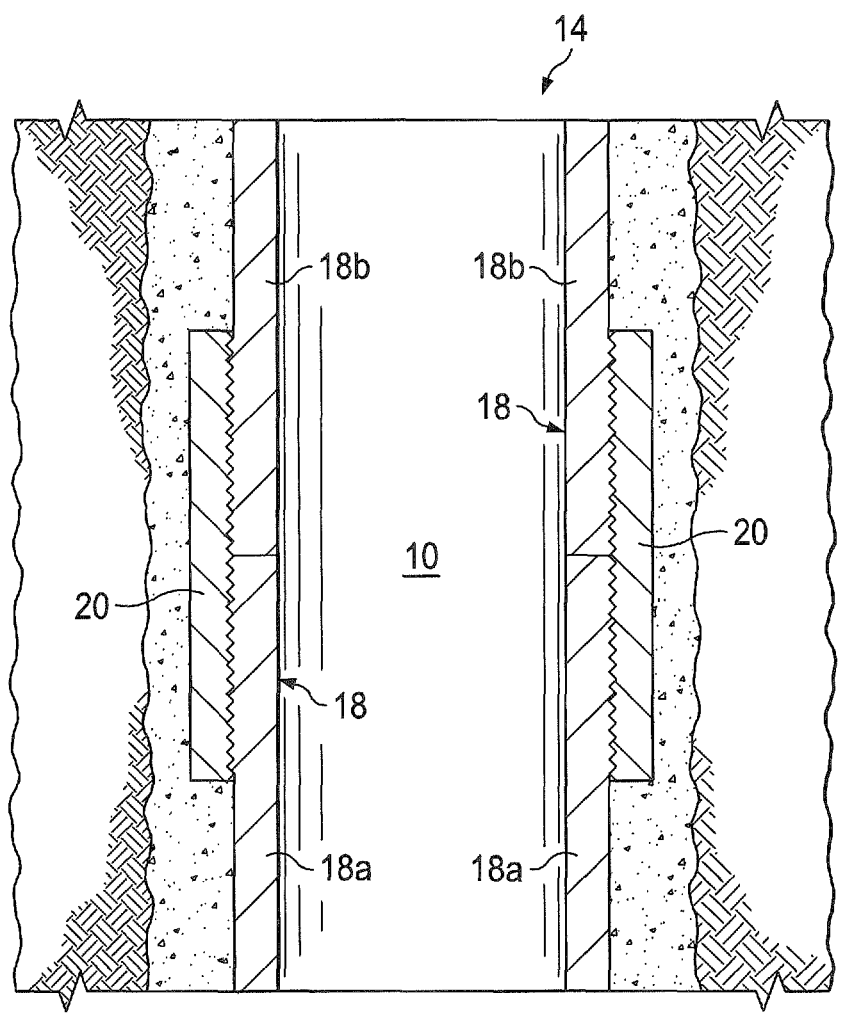
FIG. 2 is an enlarged view of a portion of the well casing of the structure illustrated in FIG. 1.
Figure 3A:
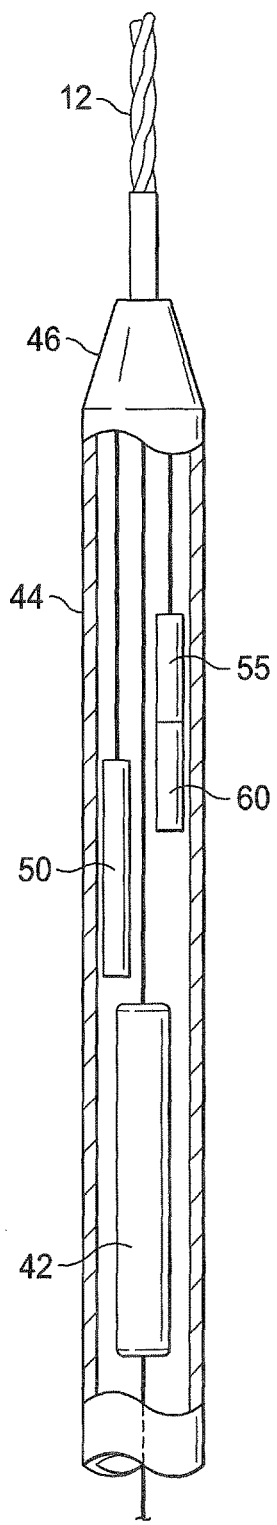
FIG. 3A is a schematic diagram of an upper portion of a borehole to surface electromagnetic transmitter according to the present invention.
Figure 3B:
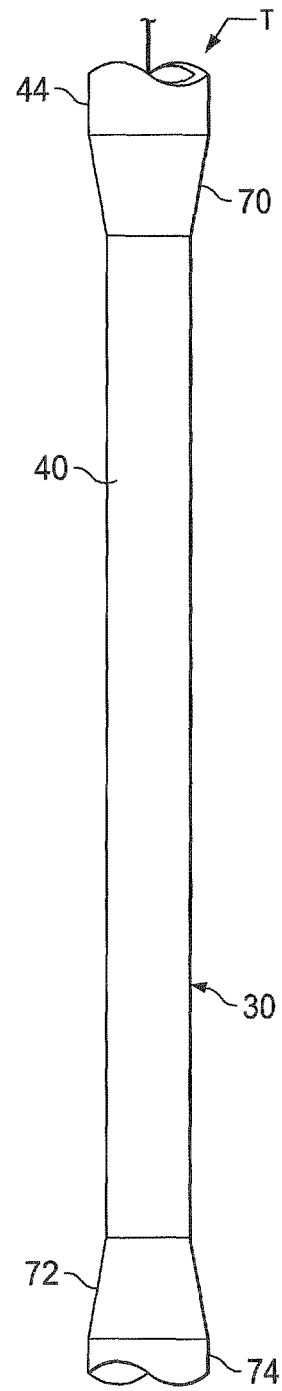
FIG. 3B is a schematic diagram of an intermediate portion of a borehole to surface electromagnetic transmitter according to the present invention.
Figure 3C:
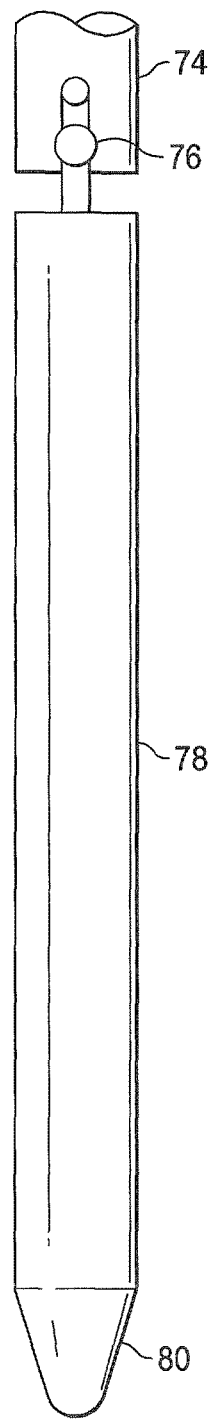
FIG. 3C is a schematic diagram of a lower portion of a borehole to surface electromagnetic transmitter according to the present invention.

In the drawings, a borehole to surface electromagnetic (BSEM) survey system B is shown schematically in FIG. 1 in connection with a well borehole 10 which has been drilled into the earth through rock in subsurface earth formations F having hydrocarbon fluids of interest. An electromagnetic energy transmitter T (FIGS. 3A, 3B and 3C) according to the present invention is mounted with a wireline 12 for electromagnetic surveys of the subsurface earth formations F from the well borehole 10. As is typical, the well borehole 10 has a casing 14 (FIGS. 1 and 2) installed along its extent into the earth to a location near a reservoir. A typical casing string 14 extends several thousands of feet from wellhead 15 at or above ground level to a lowermost casing section or casing shoe 16 within the wellbore 10. Below the depth of the casing shoe at 16, the lower portion of the well where no casing is present is what is known as open hole 17.

The casing 14 is formed of lengths of tubular joint members 18 (FIG. 2) connected at upper and lower end portions 18a and 18b to adjacent tubular members 18 by casing collars 20. The ends of each tubular joint or segment 18 of casing string 14 are externally threaded, and the collars 20 are internally threaded to mate with the threaded portion of the adjacent casing members 18. As is conventional, where two pieces of casing pipe 18 are joined with a collar 20, there may in some wells be a small gap between the adjacent ends of the two sections of casing. Alternatively, in what is known as "flush joint" casing, no gap is present between the ends of adjacent casing member sections which are held in abutting relationship by collar 20.

In connection with borehole to surface electromagnetic (BSEM) surveys, the transmitter T and wireline cable 12 are suitably supported at the wellhead 15 such as by a sheave wheel 22, which is used to raise and lower the transmitter T in the wellbore 10. During the borehole-surface or borehole to surface electromagnetic surveys, two electrodes are used. A first electrode 30 (FIG. 3B) of the transmitter T according to the present invention is in the well borehole 10, which serves as the transmitter well to transmit electromagnetic energy of desired frequency and amplitude into earth formations around the well borehole for travel through the subsurface earth formations F. The other electrode 32 (FIG. 1), which may be a ground electrode, is at the earth's surface 34 along with a receiver array A indicated schematically in FIG. 1. The receiver array A is composed of electromagnetic energy receivers 36 located at spaced positions on the earth over a surface area conforming to dimensions of a reservoir of interest. Receivers in the receiver array A detect the transmitted energy field after passage through the earth from the transmitter electrode T. A borehole to surface electromagnetic survey allows mapping of the fluid (typically oil and water) distribution in large areas of the reservoir a few (typically 2-4) kilometers away from the well in which the transmitter electrode had been positioned. Parameters of interest in such a survey are resistivity and induced polarization or IP, as will be set forth.

The transmitter electrode T located in the well 10 is activated at depths of interest. The resultant electromagnetic field is sensed in the time and frequency domains by the receiver array A. Surveys of this type are repeatable at required intervals over a period of time to track migration of subsurface fluids.

The electromagnetic energy transmitter T includes a conductive metal bar or rod 40 of copper or other similar conductive material. The conductive electrode energy source 40 is operatively connected to a control circuit 42 which responds to control signals sent from the surface from a transmitter vehicle V at the surface over the wireline 12 and activates the conductive electrode 40 to emit electromagnetic energy of the desired frequency and amplitude for a selected time and duration during BSEM surveying.

According to the present invention, the borehole depths at which the BSEM survey electromagnetic energy is emitted by the transmitter T during surveys are obtained in a manner to be set forth. The borehole depth readings are recorded along with the sensed electromagnetic fields corresponding to emissions at that depth in a suitable data memory in a computer or data processor in a logging vehicle or truck L (FIG. 1). Once recorded, the BSEM data and depth measurements are transferred as needed into the data processing system or computer for on-site processing and analysis and are available for further processing and analysis elsewhere. Records of the time and content of the electromagnetic energy specified by control signals are also furnished from the transmitter vehicle V to data recoding computer or processor equipment in the logging vehicle or truck L.

The electromagnetic energy transmitter T also includes a sonde body 44 (FIGS. 3A and 3B) connected to the wireline 12 by an upper connector subassembly 46. The transmitter T is adapted to be lowered by the wireline 12 in the well borehole 10 to the various depths indicated as adjacent or near the formations of interest for BSEM surveying. The upper connector subassembly 46 is mounted above the sonde body 44 operatively coupling the control circuit 42 to the wireline 12 to provide electrical energy as well as mechanical connection for the transmitter T. The upper connector subassembly 46 permits the flow of electrical current to provide power for signals emitted by the electromagnetic energy source 40 during surveys and passage of control signals to the control circuit 42.

With the present invention, the electromagnetic energy transmitter T is provided with a casing collar locator 50 mounted within the sonde body 44 and electrically connected through connector subassembly 46 and wireline 12 with surface electronics in the logging vehicle L to provide indications of movement of the transmitter T and sonde body 44 past casing collars 20 in the casing string 14 during movement of the transmitter T through the well borehole 10. The casing collar locator 50 may be one of several available types, such as those available from Sondex (General Electric Co.) of Hampshire, UK. In the casing collar locator 50, magnetic sensors detect the presence of casing collars 20 by sensing larger metallic mass at the location of the casing collar at the ends of the sections 18 of casing than along the length of the casing sections 18.

Electronic circuitry within the casing collar locator 50 forms electrical signals usually in the form of pulses as the locator passes successive casing collars 20 during movement of the transmitter T through the well borehole 15. The casing collars 20 are located at defined known lengths from each other according to the known distance or length of a casing section 18 between its ends 18. Thus a count of the number of casing collars 20 passed during movement of the transmitter to a target depth such as shown at 52 or 54, for example, either in the open hole region 17 or within the casing string 14 indicates accurately for the purposes of the present invention the depth of the transmitter T. The casing collar locator 50 thus measures the position of the transmitter T relative to the last casing point or casing shoe at depth 16. The casing collar locator 50 is provided with on-off switching capability so that measurements are not being made with the locator during the transmission of electromagnetic signals from the transmitter T. Thus, the casing collar locator 50 is sensing and transmitting signals indicating the presence of casing collars only at those times when the locator is passing through the casing shoe 16 before entering in the target zone.

The transmitter T of the present invention thus compensates for any potential bias or distortion in the accuracy of depth locations at which the transmitter T is activated which are induced by the elongation of the wireline cable from surface to the target depth. This has been found to be satisfactorily accurate even when the transmitter is located at a depth in open hole 17. Normally there are only a few feet of open hole section at the end of a cased well. The possible elongation of the cable in the last few feet of open-hole has been found to be negligible compared to the thousands of feet in the cased section 14.

The electromagnetic energy transmitter T in accordance with the present invention is also provided with a pressure and temperature sensing capability which includes a fluid pressure sensor 55 and a temperature sensor 60 mounted in the sonde body 44. The fluid pressure sensor 55 measures fluid pressure in the well borehole at the location of the sonde body 44 within the wellbore 10. The fluid pressure sensor 55 is electrically connected with surface electronics in the logging vehicle L to provide indications of fluid pressure at the location of transmitter T. The pressure sensor 55 may be one of several available types, such as those available from Omega Data Services Limited of Aberdeen, Scotland.

The temperature sensor 60 measures fluid pressure in the well borehole at the location of the sonde body 44 within the wellbore 10. The temperature sensor 60 is electrically connected with surface electronics in the logging vehicle L to provide indications of temperature conditions at the location of transmitter T. The temperature sensor 60 may be one of several available types, such as those available from Omega Data Services Limited of Aberdeen, Scotland.

According to the present invention, it is now possible to monitor the downhole conditions of pressure as well as temperature during BSEM surveys. In this manner, well crews are able to identify and take steps to prevent a potential problem from occurring. Examples of such potential problems are overheating of the transmitter electrode T; an ignition starting in the well borehole, a gas kick in the well, an overpressure condition, and the like. Accordingly, survey crews and well crews are able to sense and detect conditions which might give rise to the risk of blowout or ignition, or might affect the quality of data.

It has also been found that due to the very low electromagnetic frequency typically used in BSEM surveys, energy emitted during the surveys does not affect the pressure and temperature measurements sensed by the sensors 55 and 60, respectively. The electromagnetic current could, however, affect pressure and temperature conditions downhole. The present invention by including pressure sensors and temperature sensors integrated in the BSEM transmitter T is able to detect possible anomalous increase of temperature or pressure, or both, due to a number of reasons. Examples are overheating of the BSEM transmitter electrode or antenna 30, with the risk of melting the transmitter T or wireline cable 12; an anomalous hydrocarbon overpressure bubble entering the well; and possible ignition of gases started downhole, whether or not triggered by the electromagnetic current emitted. The pressure and temperature readings sensed with the present invention are important for timely preventive measures to be taken at the surface, such as stopping transmission of the BSEM signals, activating the well control procedures, emergency measures as required.

A lower connector subassembly 70 (FIG. 3B) is mounted below the sonde body 44 and connects the conductive metal bar 40 of electrode 30 source to the control circuit 42 so that electrical power is provided to the metal bar 40 to emit electromagnetic energy of the desired frequency and amplitude for a selected time and duration during BSEM surveying.

The conductor bar 40 is a solid bar of requisite thickness for mechanical strength formed of copper and is, for example about 0.8 m in length. A weight bar connector 72 is mounted at a lower end of conductor bar 40 to connect a swivel connector subassembly 74 with upper portions of the transmitter T. The swivel connector subassembly 74 provides as indicated schematically at 76 for pivotal movement and connection of a weight bar member 78 of a suitably heavy material to the upper portions of the transmitter T. The weight bar member 78 assists, as is conventional, in proper orientation and movement of the transmitter T in the well borehole 10. Typically, as indicated at 80 a nose plug is mounted below the weight bar 78 for facilitating movement of the transmitter T through the well borehole 10.

In the operation of the present invention borehole to surface electromagnetic surveying of subsurface earth formations is performed in the well borehole 10 when the transmitter T with sonde body 44 are lowered to locations of interest in the borehole in the free hole zone 17 borehole below the casing 18. A measure is formed, during such movement, with the casing collar locator 50 of the number of casing collars 20 past which the transmitter and sonde body travel during lowering and the measurements forwarded to the surface over the wireline 12 and recorded in the logging truck L. In this manner, the depth of the transmitter T in the borehole 10 is measured and recorded based on the measured number of casing collars. The casing collar locator 50 is then deactivated when transmitter T is at a location of interest. Electromagnetic energy is then emitted from the conductive bar 40 at the location of interest to travel through the subsurface formations for electromagnetic energy surveying of the subsurface earth formations.

Figure 4:
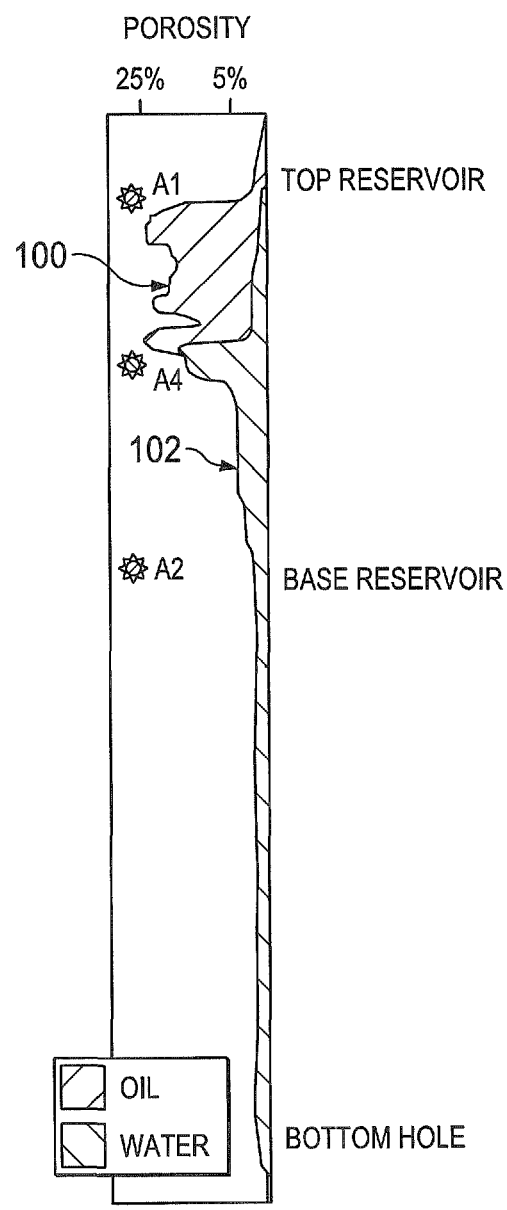
FIG. 4 is an example display of well log data from conventional well logs regarding subsurface formations as a function of depth in a well borehole.

FIG. 4 is a simplified example display of well log data from conventional well logs as a function of borehole depth regarding subsurface formations as a function of depth in the well borehole 10. The well log or plot in FIG. 4 illustrate as a function of depth over a range of porosity values from below 5% to about 25% the relative presence of oil as indicated at 100 and water as indicated at 102. The measurements from which the data displayed in FIG. 4 were attained from an example well in an existing reservoir.

Figure 5:
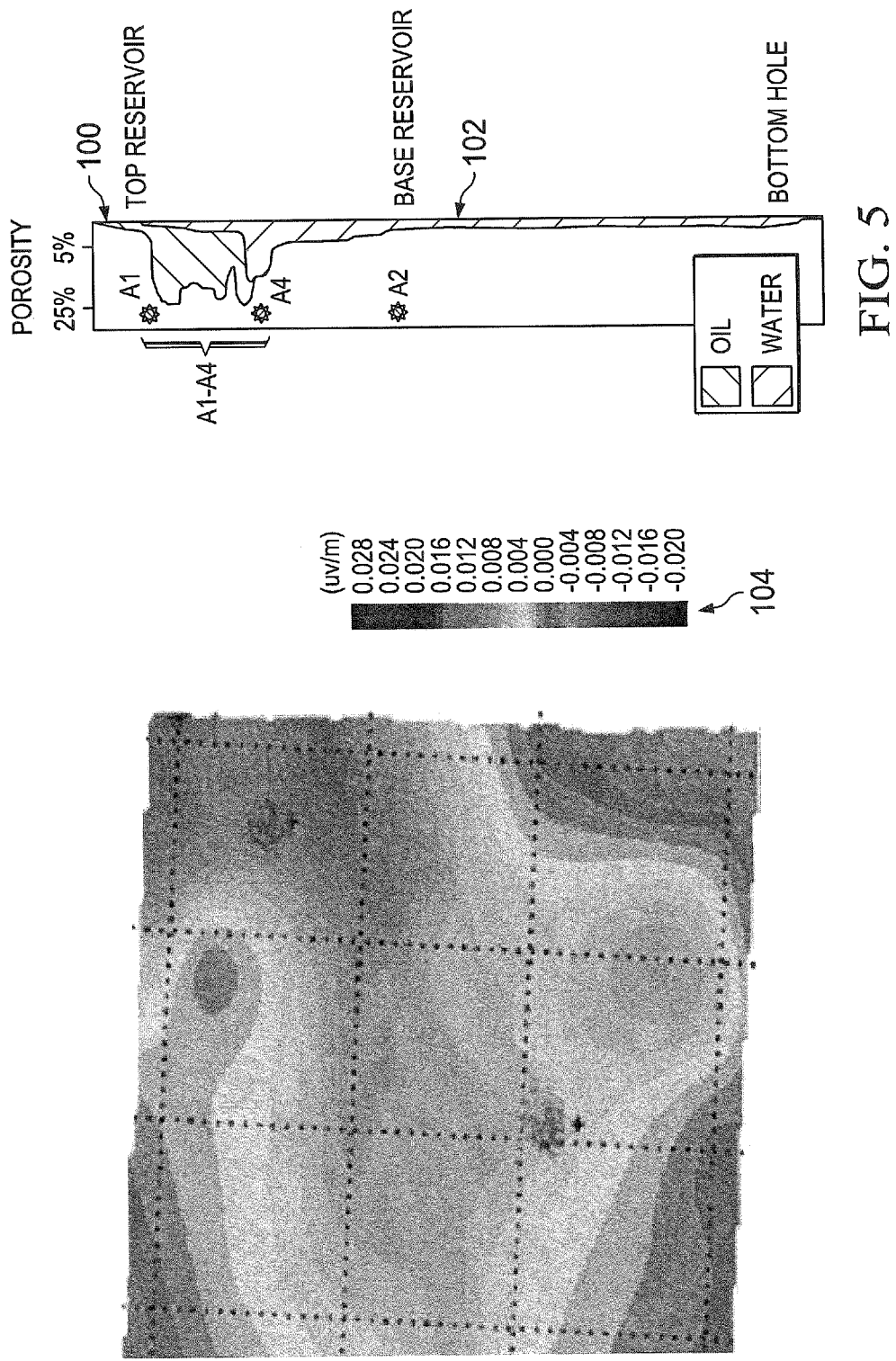
FIG. 5 is a plot of induced polarization data obtained from subsurface formations over a range of depths during borehole to surface electromagnetic surveying and mapping of subsurface formations adjacent the well borehole in which the well log data of FIG. 4 was obtained.

Another measurement of interest in addition to the well logs of FIG. 4 obtainable from the same subsurface formations is data obtainable from BSEM surveys. One of the parameters obtainable from data from BSEM surveys of subsurface earth formations from a well borehole is Induced Polarization or IP. Plots or maps of induced polarization for an investigative layer in the subsurface formations are utilized in discriminating oil from water zones in the formations near or even within a few kilometers from the well borehole. If the induced polarization maps obtained from BSEM survey data indicate a high induced polarization measure, this indicates that there is a high oil saturation in the investigated layer. Conversely, if the induced polarization maps obtained from BSEM survey data indicate a low induced polarization measure, this indicates that there is a water saturation in the investigated layer. FIG. 5 is a plot or map of induced polarization as a function of surface area or extent based on BSEM survey data for a layer indicated as extending from depth A1 through depth A4 in the well which is the subject of the well logs plotted in FIG. 4. For ease of reference and analysis, the well log plot is also included in FIG. 5. The induced polarization measurements as determined from BSEM surveys are plotted in the color key 104 for the map of FIG. 5. The locations or depths so indicated in the well of depths A1 and A4 are depicted in the well log plots of FIGS. 4 and 5.

Figure 6:
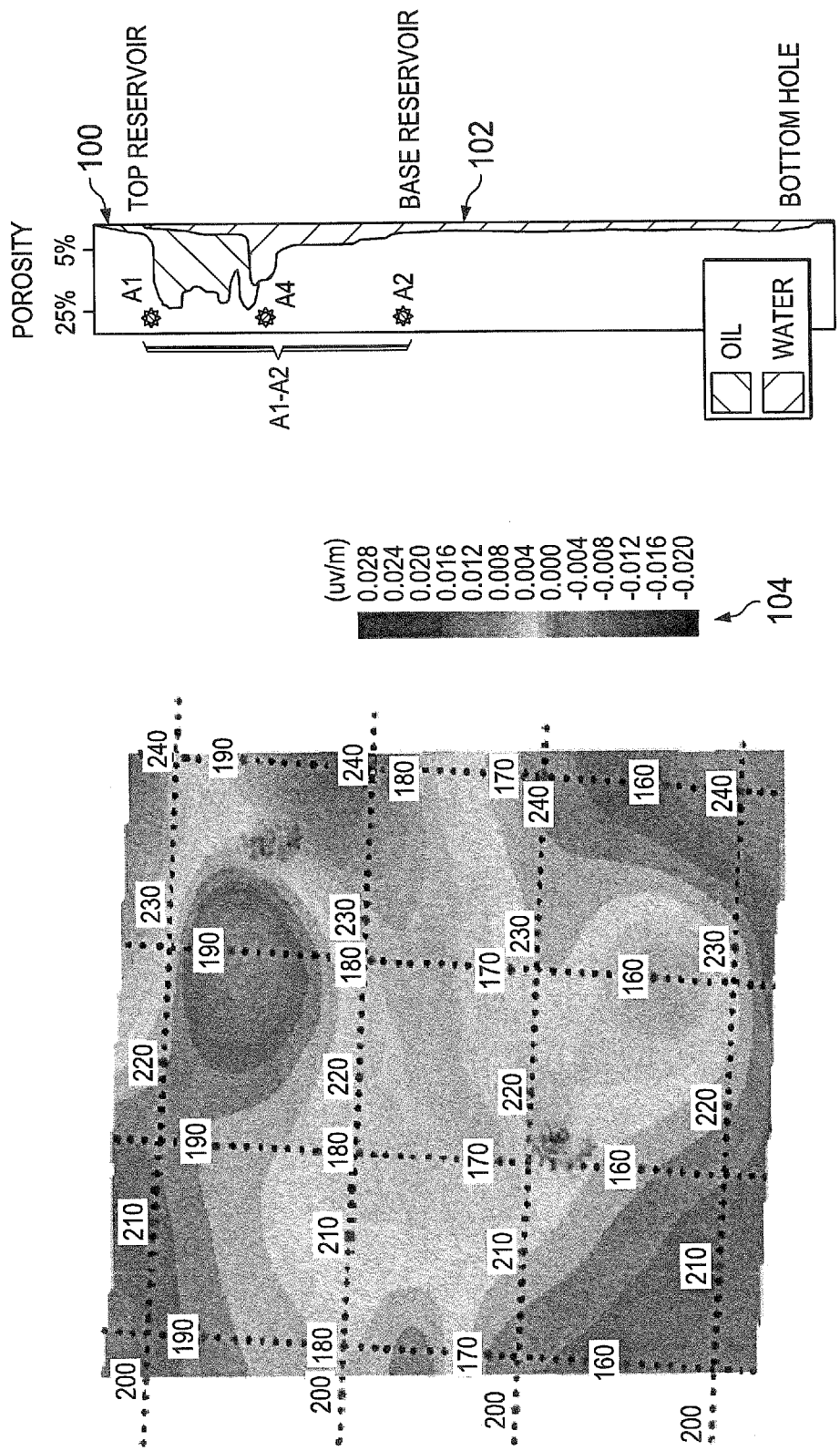
FIG. 6 is a plot of induced polarization data obtained from subsurface formations over a different range of depths than FIG. 5 during borehole to surface electromagnetic surveying and mapping of subsurface formations adjacent the well borehole in which the well log data of FIG. 4 was obtained.

FIG. 6 is a plot or map of induced polarization based on BSEM survey data for a layer determined according to the present invention as extending from the depth A1 through depth A2 in the same well which is the subject of the well logs plotted in FIG. 4. For ease of reference and analysis, the well log plot is also included in FIG. 6. The depth A2 is also indicated in the well log plotted in FIG. 4 along with depths A1 and A4. The map co-ordinates are plotted in the margins of FIG. 6. As is evident, the areas which are the subject of FIGS. 5 and 6 substantially overlap. The induced polarization measurements as determined from BSEM surveys are plotted in the color key 104 for the map of FIG. 5 which is the same as that of FIG. 6.

In the induced polarization maps of FIGS. 5 and 6 the differences of induced polarization response are apparent. In the map of FIG. 5, the induced polarization data map provides indications of oil as indicated by the areas in the upper right quadrant of the map when the transmitter is located at the layer between depths A1 and A4. Conversely, the induced polarization data map of FIG. 6 which refers to the layer A1 and A2 indicates the presence of substantially more water in the same general area of the reservoir of interest, with water indicated in the same reservoir area.

Figure 7:
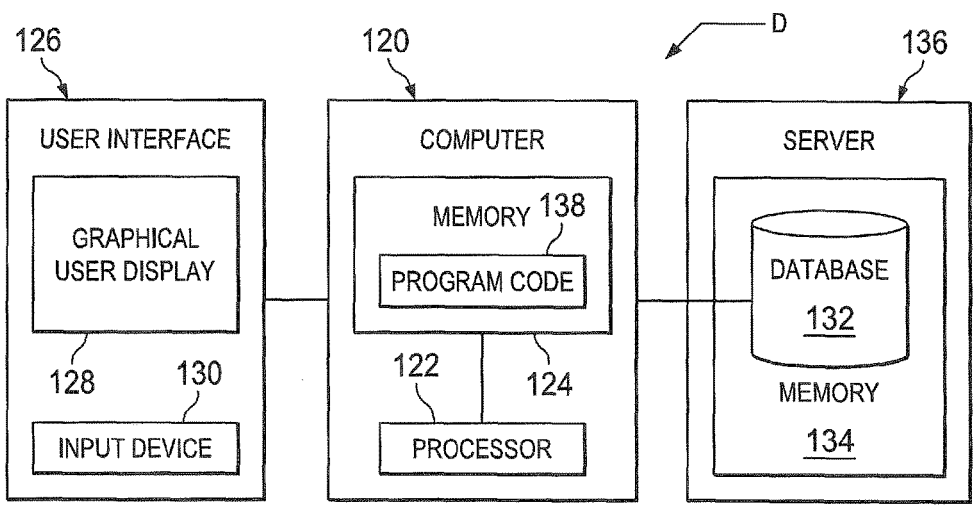
FIG. 7 is a schematic diagram of a computer system for processing of borehole to surface transmitter data according to the present invention.

As illustrated in FIG. 7, a data processing system D according to the present invention for processing of borehole to surface transmitter data includes a computer 50 having a processor 122 and memory 124 coupled to the processor 122 to store operating instructions, control information and database records therein. The computer 120 may, if desired, be a multicore processor with nodes such as those from Intel Corporation or Advanced Micro Devices (AMD), or a mainframe computer of any conventional type of suitable processing capacity such as those available from International Business Machines (IBM) of Armonk, N.Y. or other source.

It should be noted that other digital processors, may be used, such as personal computers in the form of a laptop computer, notebook computer or other suitable programmed or programmable digital data processing apparatus.

The computer 120 has a user interface 126 and an output display 128 for displaying output data or records of processing of processing of borehole to surface transmitter data and other logging data measurements performed according to the present invention to obtain measures of interest for electromagnetic surveying and mapping of subsurface formations. The output display 128 includes components such as a printer and an output display screen capable of providing printed output information or visible displays in the form of graphs, data sheets, graphical images, data plots and the like as output records or images.

The user interface 126 of computer 120 also includes a suitable user input device or input/output control unit 130 to provide a user access to control or access information and database records and operate the computer 120. Data processing system D further includes a database 132 stored in memory, which may be internal memory 124, or an external, networked, or non-networked memory as indicated at 134 in an associated database server 136.

The data processing system D includes program code 138 stored in memory 124 of the computer 120. The program code 138, according to the present invention is in the form of computer operable instructions causing the data processor 122 to form obtain a measure of transmissibility of fluid in subsurface formations, as will be set forth.

It should be noted that program code 138 may be in the form of microcode, programs, routines, or symbolic computer operable languages that provide a specific set of ordered operations that control the functioning of the data processing system D and direct its operation. The instructions of program code 138 may be may be stored in memory 124 of the computer 120, or on computer diskette, magnetic tape, conventional hard disk drive, electronic read-only memory, optical storage device, or other appropriate data storage device having a computer usable medium stored thereon. Program code 138 may also be contained on a data storage device such as server 134 as a computer readable medium, as shown.

Figure 8:
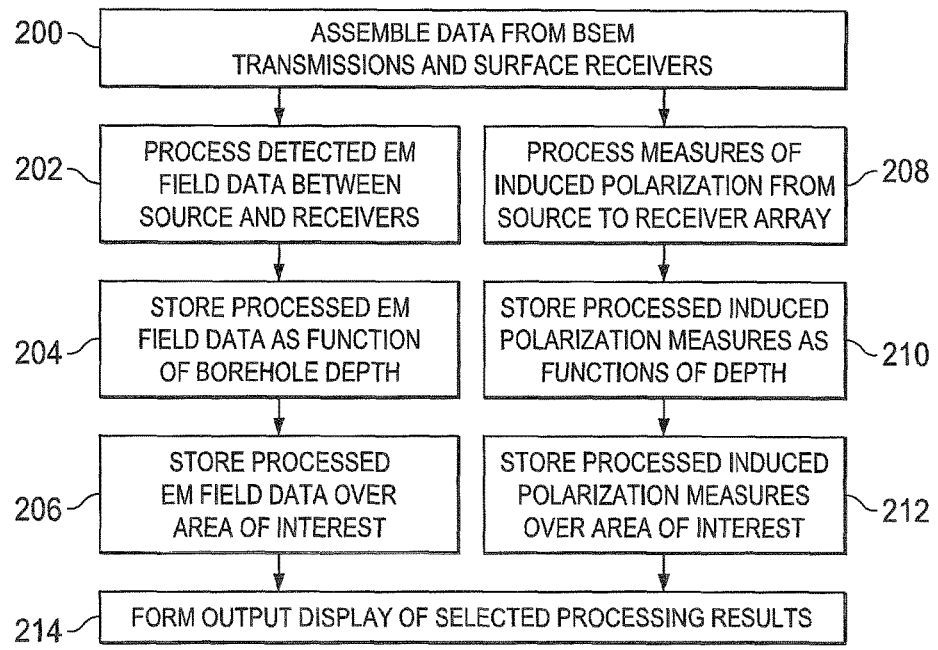
FIG. 8 is a functional block diagram of a set of data processing steps performed in the computer system of FIG. 7 during the processing of borehole to surface transmitter data according to the present invention.

A flow chart C of FIG. 8 herein illustrates the structure of the logic of the present invention as embodied in computer program software. Those skilled in the art appreciate that the flow charts illustrate the structures of computer program code elements that function according to the present invention. The invention is practiced in its essential embodiment by computer components that use the program code instructions in a form that instructs the digital data processing system D to perform a sequence of processing steps corresponding to those shown in the flow chart C.

With reference to FIG. 8, the flow chart C is a high-level logic flowchart illustrates a method according to the present invention of processing of borehole to surface transmitter data to obtain measures of interest for electromagnetic surveying and mapping of subsurface formations. The method of the present invention performed in the computer 120 can be implemented utilizing the computer program steps of FIG. 8 stored in memory 124 and executable by system processor 122 of computer 120. The survey and logging data resulting from measurements taken with the survey system B of FIG. 1 are provided as inputs to the data processing system D.

As shown in the flow chart C of FIG. 8, a preferred sequence of steps of a computer implemented method or process for obtaining measures of interest for electromagnetic surveying and mapping of subsurface formations according to the present invention is illustrated schematically. During step 200, data is obtained for further processing from borehole to surface electromagnetic surveying by electromagnetic signals sent from the borehole transmitter T and detected by the receivers in the surface array A in the manner described above. Additionally, data regarding the transmitter depths, receiver location positions or co-ordinates, synchronized time of transmission, transmission signal parameters (amplitude, phase, frequency), geological layer, and topography are assembled during step 200.

During step 202, the data assembled during step 200 are processed to determine the detected electromagnetic field between the borehole source T at the depth or depths of interest and selected receivers of the receiver array A. It should be understood that the entire group of receivers in the array A may be selected, if desired.

The processing during step 202 to determine the detected electromagnetic field can be performed in the time domain or the frequency domain and can be performed according to several conventional methods. Examples include multidimensional inversion and Occam inversion such as "Occam's Inversion: A Practical Algorithm for Generating Smooth Models from Electromagnetic Sounding Data, S. Constable, R. Parker, and C. Constable, Geophysics, Vol. 52, No. 3 (March 1987): P 289-300". It should be understood that other suitable methodologies to determine the detected electromagnetic field can also be used during performance of step 202.

The detected electromagnetic fields obtained during processing in step 202 are the stored in appropriate memory of the data processing system D during step 204 as functions of depth in the borehole 10. The data stored during step 204 is then available as electromagnetic well logs as functions of borehole depth in the subsurface formation of interest for further analysis and study.

During step 206, the processed data from step 202 are also stored in memory according to the particular grouping of receivers selected in the array A. The data stored during step 206 is then available as electromagnetic field mapping data regarding the subsurface formation of interest for further analysis and study.

During step 208, the assembled data from step 200 and the processed data from step 202 are processed to determine induced polarization or IP in selected formations at locations or depths of interest in subsurface formation F. During step 210, induced polarization for selected receivers in the array A are determined and assembled. Again, the entire array may be selected as a group if desired.

Processing during step 208 to determine induced polarization can be done, for example, by either inversion or analytically. Examples of such processing are those described in the article, "Induced Polarization Interpretation for Subsurface Characterisation: A Case Study of Obadore, Lagos State", Alabi, Ogungbe, Adebo, and Lamina, Scholars Research Library, Archives of Physics Research, (2010), 1 (3):34-43. The processing during step 208 is performed to determine variations of apparent resistivity as a function of different transmitted electromagnetic frequencies. This dispersion behavior is related to the relative presence of water and hydrocarbons, as described in the article, "Carbonate Reservoir Rocks Show Induced Polarization Effects, Based on Generalized Effective Medium Theory", Zhdanov, Burtman, and Marsala, $75^{th}$ EAGE Conference & Exhibition, SPE EUROPE 2013, London, UK, (10-13 Jun. 2013).

The determined induced polarization in the portions or regions of interest in the subsurface formation F resulting from steps 208 and 210 are then stored appropriate memory of the data processing system D during step 212. During step 214, selected ones from one or more types of the electromagnetic well log data, electromagnetic field data and induced polarization data in subsurface formations of interest resulting from the processing are made available in response to user requests in the subsurface formation of interest for further analysis and study.

Accordingly, with the present invention a more precise measure and knowledge of the depth where electromagnetic signal energy is being transmitted is provided. A more accurate reading of the depth location of the transmitting antenna or electrode 30 is available. It can be seen that if the location of the electromagnetic transmitter antenna 30 is properly indicated at A2 instead of A4 a markedly different map of fluid distribution is obtained and measured for the selected reservoir layer It can also be seen that thus it is now possible to have an accurate measurement of the depth position of the BSEM transmitter T downhole.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of borehole to surface electromagnetic surveying of subsurface earth formations from a well borehole which has a casing installed along its extent into the earth to a location of interest near a formation of interest for processing to obtain a measure of the subsurface earth formations, the casing being formed of lengths of tubular members connected at end portions to adjacent tubular members by casing collars, the method comprising the steps of:
   lowering a borehole to surface electromagnetic survey transmitter electric current source with a sonde body connected therewith to the location of interest in the borehole below the casing;
   locating a ground electrode at the earth surface;
   locating an array of surface electromagnetic field receivers at spaced positions over a surface area on the earth surface;
   forming a measure with the casing collar locator of the number of casing collars past which the source and sonde body travel during the step of lowering to determine the depth of the source and sonde body in the borehole based on the measured number of casing collars;
   deactivating the casing collar locator when the source and the sonde body are at the location of interest; and
   emitting electromagnetic energy by flow of electric current from the borehole to surface electromagnetic survey transmitter electric current source at the location of interest to travel through the subsurface formations to the surface and form an electromagnetic field;
   receiving electric current from the borehole to surface electromagnetic survey transmitter electric current source with the ground electrode at the earth surface;
   detecting with the located array of surface receivers at spaced positions over the earth surface a measure of the formed electromagnetic field resulting from the emitted electromagnetic energy by flow of electric current from the borehole to surface electromagnetic survey transmitter electric current source at the location of interest; and
   processing the detected electromagnetic field in a computer to obtain a measure for electromagnetic energy surveying of the subsurface earth formations.

2. A method of obtaining by borehole to surface electromagnetic surveying a measure of induced polarization of subsurface earth formations from a well borehole which has a casing installed along its extent into the earth to a location of interest near a formation of interest, the casing being formed of lengths of tubular members connected at end portions to adjacent tubular members by casing collars, the method comprising the steps of:
   lowering a borehole to surface electromagnetic survey transmitter electric current source with a sonde body connected therewith to the location of interest in the borehole below the casing;
   locating a ground electrode at the earth surface;
   locating an array of surface electromagnetic field receivers at spaced positions over a surface area on the earth surface;
   forming a measure with the casing collar locator of the number of casing collars past which the source and sonde body travel during the step of lowering to determine the depth of the source and sonde body in the borehole based on the measured number of casing collars;
   deactivating the casing collar locator when the source and the sonde body are at the location of interest; and
   emitting electromagnetic energy by flow of electric current from the borehole to surface electromagnetic survey transmitter electric current source at the location of interest to travel through the subsurface formations to the surface and form an electromagnetic field;
   receiving electric current from the borehole to surface electromagnetic survey transmitter electric current source with the ground electrode at the earth surface;
   detecting with the located array of surface receivers at spaced positions over the earth surface a measure of induced polarization resulting from the emitted electromagnetic energy by flow of electric current from the borehole to surface electromagnetic survey transmitter electric current source at the location of interest; and
   processing the detected measure of induced polarization in a computer to obtain a measure of induced polarization for induced polarization logging of the subsurface earth formations.

3. The method of claim 2, further including the step of:
   storing in computer memory the obtained measure of induced polarization.

4. The method of claim 2, further including the step of:
   forming an output display of the obtained measure of induced polarization.

5. A method of borehole to surface electromagnetic survey for logging the electromagnetic response of subsurface earth formations as a function of depth in a well borehole which has a casing installed along its extent into the earth to a location of interest near a formation of interest, the casing being formed of lengths of tubular members connected at end portions to adjacent tubular members by casing collars, the method comprising the steps of:
   lowering a borehole to surface electromagnetic survey transmitter electric current source with a sonde body connected therewith to the location of interest in the borehole below the casing;
   locating a ground electrode at the earth surface;
   locating an array of surface electromagnetic field receivers at spaced positions over a surface area on the earth surface;
   forming a measure with the casing collar locator of the number of casing collars past which the source and sonde body travel during the step of lowering to determine the depth of the source and sonde body in the borehole based on the measured number of casing collars;
   deactivating the casing collar locator when the source and the sonde body are at the location of interest; and
   emitting electromagnetic energy by flow of electric current from the borehole to surface electromagnetic survey transmitter electric current source at the location of interest to travel through the subsurface formations to the surface and form an electromagnetic field;
   receiving electric current from the borehole to surface electromagnetic survey transmitter electric current source with the ground electrode at the earth surface;
   detecting with the located array of surface receivers at spaced positions over the earth surface a measure of the formed electromagnetic field as a function of borehole depth resulting the emitted electromagnetic energy by flow of electric current from the borehole to surface electromagnetic survey transmitter electric current source at the location of interest; and
   processing the detected electromagnetic field in a computer to obtain a measure of the depth in the well borehole of the electromagnetic logging of the subsurface earth formations.

6. The method of claim 5, further including the step of:
storing in computer memory the obtained measure of the depth in the well borehole of the electromagnetic logging of the subsurface earth formations.

7. The method of claim 5, further including the step of:
forming an output display of the obtained measure of the depth in the well borehole of the electromagnetic logging of the subsurface earth formations.

* * * * *